(12) United States Patent
Polozoff

(10) Patent No.: US 7,774,776 B2
(45) Date of Patent: Aug. 10, 2010

(54) SINGLE PORT INITIAL CONTEXT ACCESS TO ENTERPRISE JAVA BEAN

(75) Inventor: Alexandre Polozoff, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 1715 days.

(21) Appl. No.: 10/889,819

(22) Filed: Jul. 13, 2004

(65) Prior Publication Data

US 2006/0015881 A1  Jan. 19, 2006

(51) Int. Cl.
G06F 9/445 (2006.01)
(52) U.S. Cl. ............... 717/177; 717/174; 717/102; 717/103; 719/330
(58) Field of Classification Search ............... 717/102, 717/103, 174, 177; 719/330
See application file for complete search history.

(56) References Cited

U.S. PATENT DOCUMENTS

| | | | |
|---|---|---|---|
| 6,745,249 B1 * | 6/2004 | Newcombe | 719/315 |
| 6,745,250 B1 * | 6/2004 | Cocks et al. | 719/316 |
| 6,944,680 B1 * | 9/2005 | Lee et al. | 709/249 |
| 2002/0004850 A1 * | 1/2002 | Sudarshan et al. | 709/313 |
| 2002/0004856 A1 * | 1/2002 | Sudarshan et al. | 709/330 |
| 2003/0050932 A1 * | 3/2003 | Pace et al. | 707/100 |
| 2003/0187946 A1 * | 10/2003 | Cable | 709/215 |
| 2003/0195997 A1 * | 10/2003 | Ibert et al. | 709/318 |
| 2004/0111701 A1 * | 6/2004 | Beust | 717/108 |
| 2004/0205771 A1 * | 10/2004 | Sudarshan et al. | 719/316 |
| 2004/0237092 A1 * | 11/2004 | Jairath | 719/315 |
| 2005/0138076 A1 * | 6/2005 | Seo et al. | 707/104.1 |
| 2006/0200800 A1 * | 9/2006 | Melby | 717/114 |
| 2006/0294493 A1 * | 12/2006 | Melby | 717/104 |

OTHER PUBLICATIONS

F. Leymann. Web services: Distributed applications without limits -an outline-. G. H. and E. Rahm, editors, Proceedings of 2003: teme Business, und Web.Springer, 2003. Retrieved Jan. 2, 2009, <http://www.unitn.it/convegni/download/icsoc03/keynote/Leymann_BTW2003_Reprint.pdf>.*

* cited by examiner

Primary Examiner—Wei Y Zhen
Assistant Examiner—Matthew J Brophy
(74) Attorney, Agent, or Firm—H. Artoush Ohanian; Jill Poimboeuf; Biggers & Ohanian, LLP.

(57) ABSTRACT

Single port initial context access to an Enterprise Java Bean ("EJB") including providing EJBs, including an EJB used by a client of a Java application; deploying the Java application, including deploying, at a fixed node and port, an application server for initial context lookup; selecting through the application server a home object for the EJB used by the client; and instantiating through the home object the EJB used by the client. Providing EJBs typically includes providing database records representing EJBs, each of which includes data describing the name of an EJB, a version of the EJB, and a node and port where an instance of the EJB may be deployed. Selecting a home object typically includes creating a context object, where the context object includes a providerURL, and the providerURL includes the node and port of the application server.

20 Claims, 5 Drawing Sheets

| Bean Name | Home Name | Revision | Node | Port |
|---|---|---|---|---|
| empty | empty | empty | Node1 | 10000 |
| empty | empty | empty | Node2 | 10000 |
| empty | empty | empty | Node3 | 10000 |
| someEJB | home1a | 1.0 | Node1 | a |
| someEJB | home1b | 1.0 | Node1 | b |
| someEJB | home1c | 1.0 | Node1 | c |
| someEJB | home11a | 1.1 | Node2 | d |
| someEJB | home11b | 1.1 | Node2 | e |
| someEJB | home11c | 1.1 | Node2 | f |
| someEJB | home12a | 1.2 | Node3 | g |
| someEJB | home12b | 1.2 | Node3 | h |
| someEJB | home13a | 1.3 | Node1 | i |
| someEJB | home13b | 1.3 | Node1 | j |

Provided EJBs
304

SINGLE PORT INITIAL CONTEXT ACCESS TO ENTERPRISE JAVA BEAN

BACKGROUND OF THE INVENTION

1. Field of the Invention

The field of the invention is data processing, or, more specifically, methods, systems, and products for single port initial context access to an Enterprise Java Bean ('EJB'). 'Java' and 'EJB' are registered trademarks of Sun Microsystems, Inc.

2. Description of Related Art

Enterprise JavaBeans is a Java API developed by Sun Microsystems that defines a component architecture for multi-tier client/server systems. Enterprise JavaBeans define an architecture for the development and deployment of transactional, distributed object applications-based, server-side software components. These server-side components, called enterprise beans, are distributed objects that are hosted in Enterprise JavaBean containers and provide remote services for clients distributed throughout a network. These server-side components are sometimes known as 'Enterprise JavaBeans,' 'EJB components,' 'enterprise beans,' 'beans,' and sometimes by other terms as well. In this specification, however, the server side component is generally referred to as an 'EJB.'

EJBs are software components that run in a special environment called an EJB container. The container hosts and manages an EJB in the same manner that the Java Web Server hosts a servlet or an HTML browser hosts a Java applet. An EJB functions only in an EJB container. If an enterprise bean needs to access a JDBC connection or another enterprise bean, it does so through the container; if an enterprise bean needs to access the identity of its caller, obtain a reference to itself, or access properties it does so through the container. The enterprise bean interacts with its container through one of three mechanisms: callback methods, the EJBContext interface, or the Java Naming and Directory Interface (JNDI).

A client program contacts an EJB server and requests that the server create an EJB to do data processing on behalf of the client. The server responds by creating the server-side object (the EJB component instance that is referred to generally in this specification as an 'EJB'). The server also returns a proxy object (the EJB object, an object that implements the EJB remote interface, an object referred to generally in this specification as a 'remote object') whose interface is the same as the EJB's and whose implementation performs remote method invocations in the EJB on behalf of the client. The client then uses the remote object as if it were a local object, never knowing or caring that a server-side EJB is actually doing all the work.

How does a client program create objects on a server? Each EJB class has what is called a home interface, which defines the methods for creating EJB instances on the server. An EJB home interface extends the interface javax.ejb.EJBHome, which defines base-level functionality for a home interface. All methods in this interface are required to be remotely executable according to Java RMI (Remote Method Invocation). The EJB home interface also defines one or more factory methods named 'create( ).' The return value of these factory methods is the remote interface (that is, a remote object) for the EJB.

When a client wants to create a server-side bean, an EJB, the client uses the Java Naming and Directory Interface (JNDI) to locate the home interface for the class of bean it wants. The JNDI is a standard extension to the Java core that provides a global service to any Java environment, allowing Java programs to locate and use resources by name, to find out information about those resources, and to traverse structures of resources. A client accesses JNDI services through a method name 'lookup( )' in an instance of JNDI's InitialContext class. This initial context lookup returns an instance of a home interface for an EJB. In this specification, such an instance of a home interface is referred to as a 'home object.'

Once the client has the home interface for the EJB class it wants to create, it calls one of the factory methods, that is, a create( ) method, on the home interface to create a server-side object. The client-side home interface object does a remote method call to the EJB container on the server, which then creates the EJB component, that is, the EJB itself, and returns an EJB remote object to the client. The client may then call the remote object's methods, which are forwarded to the container and then to the EJB.

Not all clients use the same version or the same instance of an EJB. Clients in fact need access to many versions and instances of an EJB. A particular instantiation of an InitialContext object by a client, however, typically requires that the client 'know' the location where the EJB is to be instantiated. That is, the client must be configured with the node and port of the desired instance of the EJB. In large environments, an EJB may be available at multiple locations for instantiation in many revisions or versions. In a dynamic environment, where revisions come and go rapidly, node and port assignments for server-side EJB locations frequently change, but it is the client in its InitialContexts and in their providerURL settings where the changes must be configured or installed. Such client-side reconfiguration to keep up with EJB revisions and location changes is burdensome.

SUMMARY OF THE INVENTION

Methods, systems and computer program products are disclosed for single port initial context access to an Enterprise Java Bean ("EJB") that include providing EJBs, including an EJB used by a client of a Java application; deploying the Java application, including deploying, at a fixed node and port, an application server for initial context lookup; selecting through the application server a home object for the EJB used by the client; and instantiating through the home object the EJB used by the client. In typical embodiments, providing EJBs also includes providing database records representing EJBs, each of which includes data describing the name of an EJB, a version of the EJB, and a node and port where an instance of the EJB may be deployed. In typical embodiments, selecting a home object includes creating a context object, where the context object includes a providerURL, and the providerURL also includes the node and port of the application server for initial context lookup. In typical embodiments, selecting a home object also includes selecting, from among home objects associated with the provided EJBs, a list of home objects associated with a bean identifier of the EJB used by the client, and selecting a home object from the list.

In typical embodiments, the bean identifier includes a bean name. In other embodiments, the bean identifier includes a bean name and a version. In some embodiments, selecting a home object from the list includes selecting a home object from the list at random. In other embodiments, selecting a home object from the list includes selecting randomly a home object from the list of a version of the EJB used by the client. In some embodiments, selecting a home object from the list also includes selecting a home object sequentially. In other embodiments, selecting a home object from the list also includes sequentially selecting a home object of a version of the EJB used by the client.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for single port initial context access to an Enterprise Java Bean. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Single Port Initial Context Access to an Enterprise Java Bean

Figure 1:
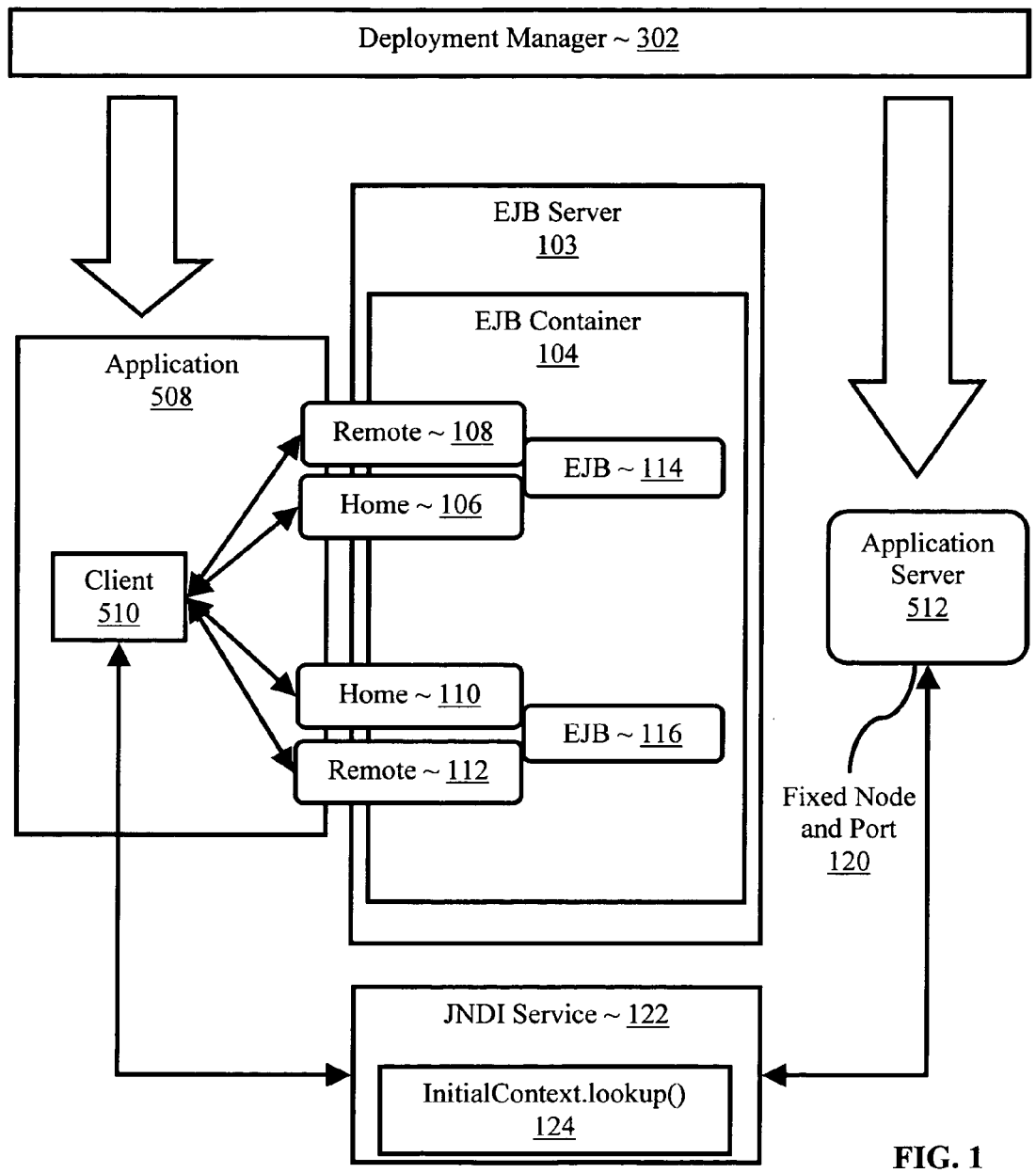
FIG. 1 sets forth a block diagram of a system for single port initial context access to an Enterprise Java Bean.

Exemplary methods, systems, and products are described for single port initial context access to an Enterprise Java Bean are described with reference to the accompanying drawings, beginning with FIG. 1. FIG. 1 sets forth a block diagram of a system for single port initial context access to an Enter- prise Java Bean that operates generally by providing EJBs (114, 116), including an EJB (114) used by a client (510) of a Java application (508); deploying the Java application (508), including deploying, at a fixed node and port (120), an application server (512) for initial context lookup; selecting through the application server (512) a home object (106) for the EJB (114) used by the client (510); and instantiating through the home object (106) the EJB (108, 114) used by the client (510).

The system of FIG. 1 includes a deployment manager (302) that deploys a Java application (508) and an application server (512). The application server (512) is deployed at a fixed node and port location (120) made known to the application (508) through deployment descriptors.

The Java application (508) contains a client (510). In the example of FIG. 1, client (510) is implicitly a Java object or a member method in a Java object. This is not a limitation of the invention, however, and examples of clients operable for single port initial context access to an EJB according to embodiments of the present invention include CORBA (Common Object Request Broker Architecture) clients, Java servlets, Java applets, and even other Java beans.

In operations of the system of FIG. 1, client (510) selects through the application server (512) a home object (106) for the EJB (114) used by the client (510). This operation may be explained with reference to the following exemplary segment of pseudocode:

InitialContext ctx=new InitialContext (providerURL=serverAddress);
Home aBeanHome=ctx.lookup("beanName", "Version");
RemoteInterface myBean=aBeanHome.create( );

This pseudocode example includes instantiation of an InitialContext object named 'ctx.' The ctx object contains a providerURL member data element named providerURL whose value is set to 'serverAddress,' that is, the node and port location of the application server for initial context lookup. In prior art, the providerURL would be set to the node and port location where an actual instance of the desired EJB would be instantiated, information with which the client-side would have to be configured. In embodiments of the present invention, the client side is configured only with the node and port location of the application server (512), which is intended to remain fixed, that is, requiring no further reconfiguration on the client side regardless of how many versions or how many node and port locations are made available for any particular EJB.

This pseudocode example includes an initial context lookup:

Home aBeanHome=ctx.lookup("beanName", "Version");

that returns a home object named 'aBeanHome.' This initial context lookup, however, also operates differently than does its analog in prior art. In prior art, the initial context lookup, that is, the JNDI function InitialContext.lookup( ), reference (124) on FIG. 1, here represented as 'ctx.lookup("beanName", "Version"),' has an input parameter in the context element 'providerURL' the node and port location of an EJB to be instantiated and is parameterized in its calling signature with a name of a bean home object that can instantiate the desired EJB at the location identified in the providerURL. In this example, however, the lookup( ) function is provided in its providerURL attribute, the node and port location (120) of the application server (512) for initial context lookup. The lookup( ) function (124) in this example is improved according to embodiments of the present invention to use the application server (512) to retrieve a list of home objects associated with a bean identifier of the EJB (114) used by the client (510)

and selecting a home object from the list. That is, rather than looking up a named instance of a factory for an EJB whose location must be configured client-side, this new lookup( ) function is parameterized with a bean name and/or version number and the location of an application server for initial context lookup. This new lookup( ) function (124) first obtains from the application server (512) a list of all the locations where a desired version of an EJB may be instantiated and selects one of them according to some selection criteria or method, random, sequential, load balancing, and so on, as will occur to those of skill in the art.

The system of FIG. 1 also operates by instantiating through the home object (106) the EJB (108, 114) used by the client (510). This process is illustrated by the pseudocode call set forth above:

RemoteInterface myBean=aBeanHome.create( );

which calls a factory method named 'create( )' in the home object returned by the lookup( ) call. That is, the lookup( ) call returns a home object, and the factory method in the home object instantiates the EJB server-side and returns the remote object representing the EJB client-side.

Figure 2:
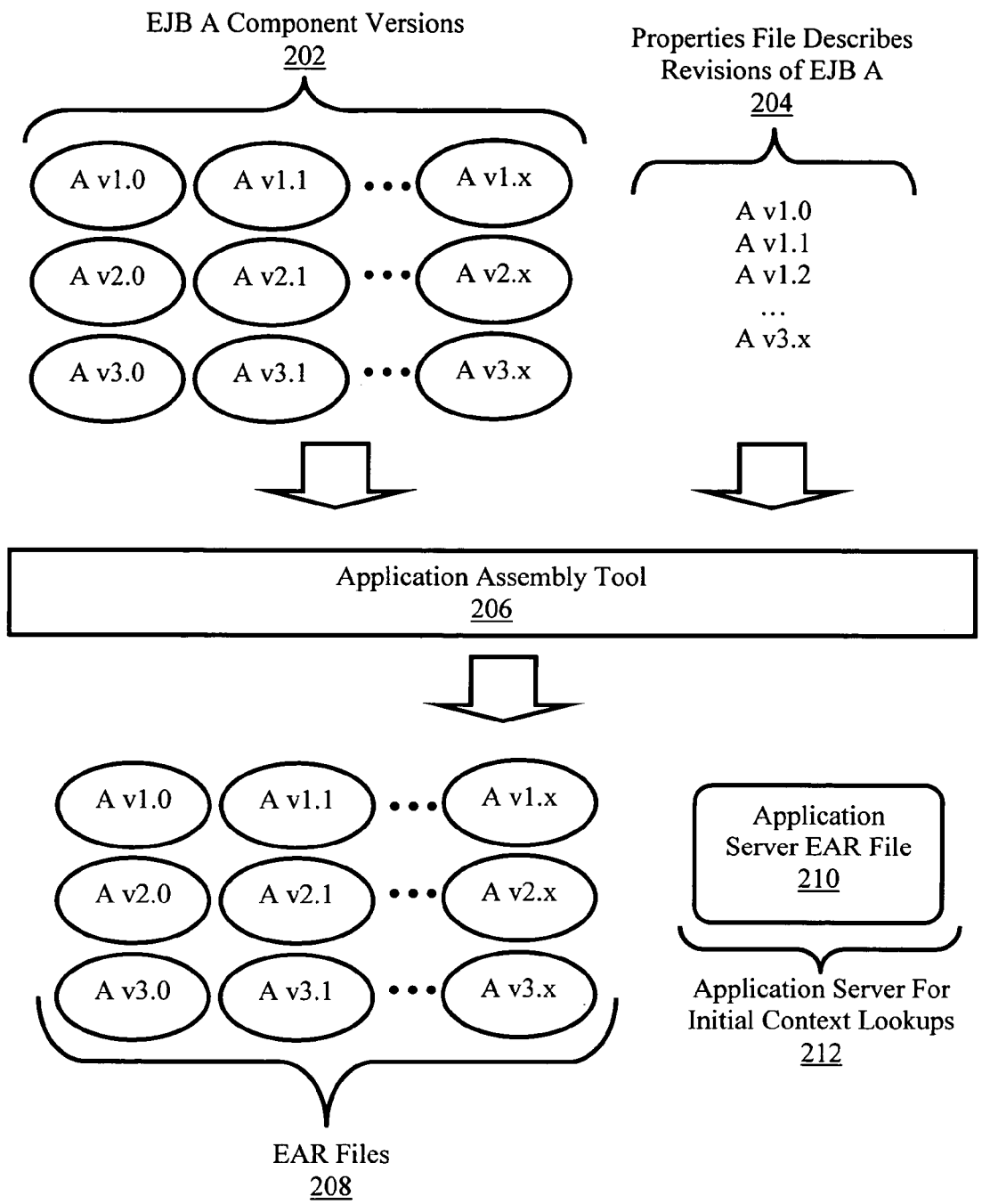
FIG. 2 sets forth a flow diagram illustrating a method for deployment of an EJB having many versions or revisions.

For further explanation, FIG. 2 sets forth a flow diagram illustrating a method for deployment of an EJB having many versions or revisions, referred to as EJB 'A,' that assembles EJB versions (202) into EAR files (208). For a group of EJB revisions (202), the application assembly tool (206) is programmed to deploy, through an application server EAR (Enterprise Archive) file (210), an application server for initial context lookup (212) at a defined node and port location into the EAR file specifically for initial client lookups. The EAR file (210) contains all JAR, WAR, and RAR component archive files for an application as well as deployment descriptor that describes the bundled components. Clients use the application server for initial lookups for EJBs as described in this specification.

In the method of FIG. 2, the application assembly tool (206) is configured to utilize a property file (204) describing the versions and revisions of EJBs to be deployed as well as the node and port locations where each version of each EJB may be instantiated. Such a property file (204) may be implemented as a separate table, for example, such as the one illustrated in FIG. 4, in EAR deployment descriptors, or in other ways as will occur to those of skill in the art.

Figure 3:
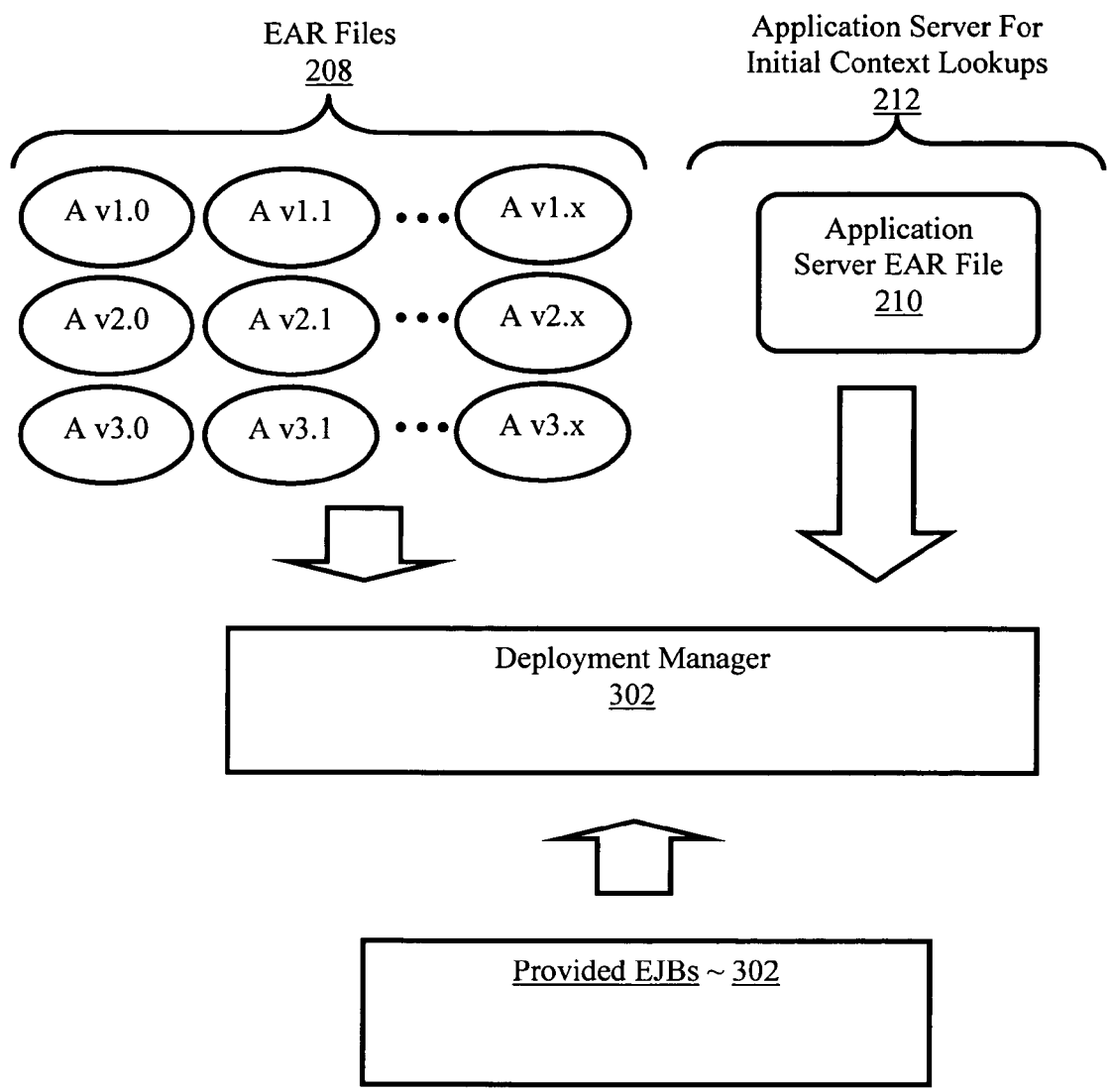
FIG. 3 sets forth a flow diagram illustrating an exemplary method of deployment of an EJB that is a continuation of the method of FIG. 2.

This explanation of a method of deployment is continued with reference to FIG. 3. FIG. 3 sets forth a flow diagram illustrating an exemplary method of deployment of an EJB that is a continuation of the method of FIG. 2. In the method of FIG. 3, a deployment manager (302) is configured to deploy the EAR files (208) and the application server EAR file (210) created by the application assembly tool (206). The deployment manager (302) deploys application server for initial context lookup (212) at fixed node and port locations identified in the deployment data provided through a 'Provided EJB' table such as the one represented at reference (302) on FIG. 3 and described in more detail on FIG. 4.

Figure 4:
FIG. 4 sets forth a table (304) describing provided EJBs.

FIG. 4 sets forth a table (304) describing provided EJBs. An EJB is 'provided' by deploying the EJB in an EJB contain on an EJB server so that the EJB becomes available for use by client programs. Except for the first three rows of table (304), each row or record in table (304) represents a version of an EJB that may be instantiated at a particular node and port location. Each of the first three rows of table (304) represents a node and port location where an application server for initial context lookup is to be deployed. The data in table (304) that describes includes EJBs include a bean name, a home name, a revision identifier, and a node and port location. The bean name is a name of an EJB. The example of FIG. 4 includes only one bean name, 'someEJB,' but that is only for clarity of explanation, not for limitation. In fact, tables for describing provided EJB according to embodiments of the present invention can describe any number of EJBs.

The 'Home Name' column in table (304) represents the name of a home class from which can be instantiated a home object for creation of an instance of an EJB having a particular Bean Name and revision number. The Node is an identifier for a particular computer on which an EJB is instantiated, identified by a computer name, a domain name, a network address, an Internet Protocol (IP) address, or otherwise as will occur to those of skill in the art. The Port is an identifier of the particular data communication software program or process that receives and processes requests and responses to effect remote method invocations according to the EJB specification.

Figure 5:
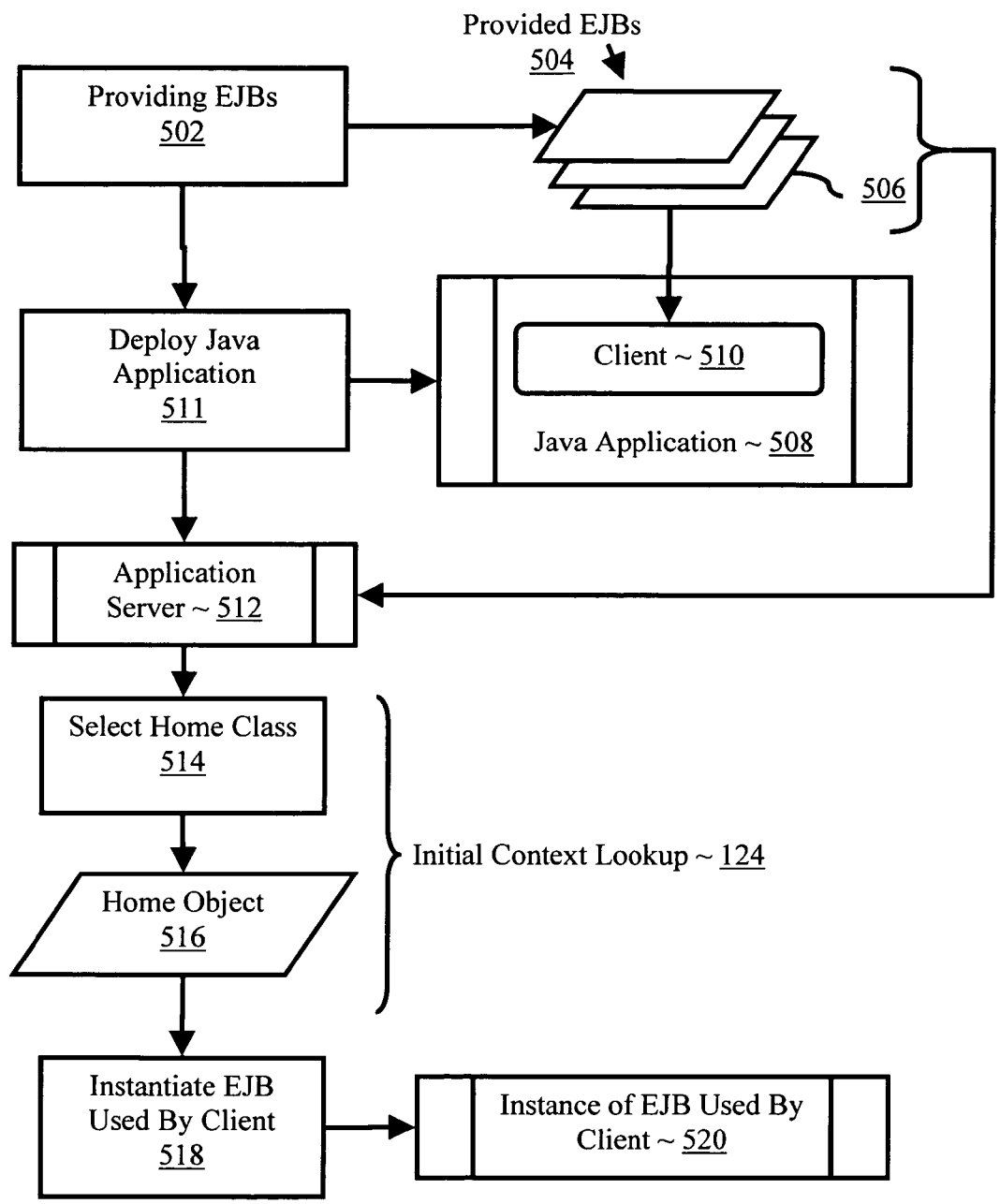
FIG. 5 sets forth a flow chart illustrating an exemplary method of single port initial context access to an Enterprise Java Bean.

For further explanation, FIG. 5 sets forth a flow chart illustrating an exemplary method of single port initial context access to an Enterprise Java Bean that includes providing (502) EJBs (504), including an EJB (506) used by a client (510) of a Java application (508). In the method of FIG. 5, providing (502) EJBs (504) is carried out by providing database records representing EJBs, each of which includes data describing the name of an EJB, a version of the EJB, and a node and port where an instance of the EJB may be deployed as shown in FIG. 4. An EJB is typically 'provided' by deploying the EJB in an EJB container on an EJB server so that the EJB becomes available for use by client programs.

The method of FIG. 5 also includes deploying (511) the Java application (508), including deploying, at a fixed node and port, an application server (512) for initial context lookup. Deploying, at a fixed node and port, an application server (512) for initial context lookup includes installing the application server at a fixed location accessible to the client's initial context lookup (124).

The method of FIG. 5 also includes selecting (514) through the application server (512) a home object (516) for the EJB (506) used by the client (510). In the method of FIG. 5, selecting (514) a home object (516) may be carried out by creating a context object, where the context object includes a providerURL that in turn includes the node and port of the application server, as illustrated, for example, by the following pseudocode segment:

InitialContext ctx=new InitialContext (providerURL=serverAddress);
Home aBeanHome=ctx.lookup("beanName", "Version");
RemoteInterface myBean=aBeanHome.create( );

in which the call to the InitialContext( ) constructor creates a context object containing a providerURL element that in turn contains the node and port location of an application server for initial context lookups.

In the method of FIG. 5, selecting (514) a home object (516) may be carried out by selecting, from among home objects associated with the provided EJBs, a list of home objects associated with a bean identifier of the EJB used by the client and selecting a home object from the list. In the exemplary pseudocode segment, the lookup( ) method is improved to accept parameters strings identifying an EJB by name and version, retrieving from an application server for initial context lookup a list of node and port locations where an EJB of that name and version may be instantiated, selecting one, and returning a home object for the selected location instance.

In the method of FIG. 5, the bean identifier may be a bean name. A bean identifier that identifies a only bean name is particularly useful when only one version of a particular EJB may be made available to a client and therefore only the bean name is required to select a list of possible node and port locations where that EJB may be instantiated. In the method of FIG. 5, the bean identifier may also include a bean name and a version. Having a bean identifier that identifies a bean name and version is useful when more than one version of a particular EJB may be made available to a client and both the bean name and version is used to select a list of possible node and port locations where that EJB may be instantiated.

In the method of FIG. 5, in embodiments where the entire list is for a single version or revision of the EJB, selecting a home object from the list may be carried out by selecting from the list any listed home object at random. In the method of FIG. 5, because in some embodiments the list may include node and port locations for more than one version of the EJB, selecting a home object from the list may be carried out by selecting randomly from the list a home object of a version of the EJB used by the client.

In the method of FIG. 5, in embodiments where the entire list is for a single version or revision of the EJB, selecting a home object from the list may also be carried out by selecting a home object sequentially. In the method of FIG. 5, because in some embodiments the list may include node and port locations for more than one version of the EJB, selecting a home object from the list may be carried out by sequentially selecting a home object of a version of the EJB used by the client. 'Sequential' selection here means that in a first context lookup for a version of an EJB for which the list contains more than one node and port location, the home object for the first such node and port location is returned by the lookup( ) function. In a second context lookup for the same version of the same EJB, the home object for the second such node and port location is returned by the lookup( ) function. And so on.

The method of FIG. 5 also includes instantiating (518) through the home object (516) the EJB (506, 520) used by the client. One way of instantiating (518) through the home object (516) the EJB (506, 520) used by the client is illustrated by the following line of pseudocode:

RemoteInterface myBean=aBeanHome.create( );

which calls a factory method named 'create( )' in the home object returned by the lookup( ) call. That is, the lookup( ) call returns a home object, and the factory method in the home object instantiates the EJB server-side and returns to the client a remote object representing the EJB client-side.

Changes useful on the client-side to implement single port initial context access to an EJB according to embodiments of the present invention are extremely simple, especially when considered in light of the burdensome processes required to administer multiple EJB versions in prior art. Such changes are illustrated again with reference to the following pseudocode segment:

InitialContext ctx=new InitialContext (providerURL=serverAddress);
    Home aBeanHome=ctx.lookup("beanName", "Version");
    RemoteInterface myBean=aBeanHome.create( );

in which the only change from prior art programming requirements are:
- that the providerURL is configured as the node and port location of an application server for initial context lookup instead of a node and port location for an instance of an EJB, and
- the lookup( ) function is overloaded and overridden to accept a bean name and/or a version identifier instead of a home name.

The lookup( ) function, whose overall operation is quite different from prior art, still returns a home object containing a factory method 'create( )' that is capable of creating the subject EJB.

Readers of skill in the art, in light of the explanation above, will appreciate that single port initial context access to an EJB according to various embodiments of the present invention generally has the benefit of providing initial context lookup functions with a single node and port location to lookup lists of nodes and ports where a version of an EJB may be instantiated. In single port initial context access to an EJB according to embodiments of the present invention, the client typically is configured only once with a node and port location of an application server for initial context lookup that is 'fixed,' that is, not changed when node and port locations for EJB versions change. Use of single port initial context access to EJBs according to embodiments of the present invention, therefore, effectively removes the administration of multiple EJB versions from the client-side to the server-side, thereby greatly simplifying the administration of multiple versions of EJBs.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for single port initial context access to an Enterprise Java Bean ("EJB"), the method comprising:
    providing EJBs, including an EJB used by a client of a software application;
    deploying the software application, including deploying, at a fixed node and port, an application server for initial context lookup;
    selecting through the application server a home object for the EJB used by the client; and
    instantiating through the home object the EJB used by the client.

2. The method of claim 1 wherein providing EJBs further comprises providing database records representing EJBs, each of which includes data describing the name of an EJB, a version of the EJB, and a node and port where an instance of the EJB may be deployed.

3. The method of claim 1 wherein:
    selecting a home object further comprises creating a context object,
    the context object comprises a providerURL, and
    the providerURL further comprises the node and port of the application server.

4. The method of claim 1 wherein selecting a home object further comprises:
    selecting, from among home objects associated with the provided EJBs, a list of home objects associated with a bean identifier of the EJB used by the client; and
    selecting a home object from the list.

5. The method of claim 4 wherein the bean identifier comprises a bean name.

6. The method of claim 4 wherein the bean identifier comprises a bean name and a version.

7. The method of claim 4 wherein selecting a home object from the list further comprises selecting a home object from the list at random.

8. The method of claim 4 wherein selecting a home object from the list further comprises selecting randomly a home object from the list of a version of the EJB used by the client.

9. The method of claim 4 wherein selecting a home object from the list further comprises selecting a home object sequentially.

10. The method of claim 4 wherein selecting a home object from the list further comprises sequentially selecting a home object of a version of the EJB used by the client.

11. A system for single port initial context access to an Enterprise Java Bean ("EJB"), the system comprising a computer processor and a computer memory operatively coupled to the computer processor, the computer memory having disposed within it computer program instructions which, when executed, cause the processor to carry out the steps of:
   providing EJBs, including an EJB used by a client of a software application;
   deploying the software application, including deploying, at a fixed node and port, an application server for initial context lookup;
   selecting through the application server a home object for the EJB used by the client; and
   instantiating through the home object the EJB used by the client.

12. The system of claim 11 wherein providing EJBs further comprises providing database records representing EJBs, each of which includes data describing the name of an EJB, a version of the EJB, and a node and port where an instance of the EJB may be deployed.

13. The system of claim 11 wherein:
   selecting a home object further comprises means for creating a context object,
   the context object comprises a providerURL, and
   the providerURL further comprises the node and port of the application server.

14. The system of claim 11 wherein selecting a home object further comprises:
   selecting, from among home objects associated with the provided EJBs, a list of home objects associated with a bean identifier of the EJB used by the client; and
   selecting a home object from the list.

15. A computer program product for single port initial context access to an Enterprise Java Bean ("EJB"), the computer program product disposed upon a computer-readable recording medium, the computer program product comprising computer program instructions which, when executed, cause automated computing machinery to carry out the steps of:
   providing EJBs, including an EJB used by a client of a software application;
   deploying the software application, including deploying, at a fixed node and port, an application server for initial context lookup;
   selecting through the application server a home object for the EJB used by the client; and
   instantiating through the home object the EJB used by the client.

16. The computer program product of claim 15 wherein providing EJBs further comprises providing database records representing EJBs, each of which includes data describing the name of an EJB, a version of the EJB, and a node and port where an instance of the EJB may be deployed.

17. The computer program product of claim 15 wherein:
   selecting a home object further comprises creating a context object,
   the context object comprises a providerURL, and
   the providerURL further comprises the node and port of the application server.

18. The computer program product of claim 15 wherein selecting a home object further comprises:
   selecting, from among home objects associated with the provided EJBs, a list of home objects associated with a bean identifier of the EJB used by the client; and
   selecting a home object from the list.

19. The computer program product of claim 18 wherein selecting a home object from the list further comprises selecting a home object from the list at random.

20. The computer program product of claim 18 wherein selecting a home object from the list further comprises selecting a home object sequentially.

* * * * *